April 12, 1966  W. C. HURD ETAL  3,245,677
PIPE SUPPORTING TOOL
Filed July 15, 1963
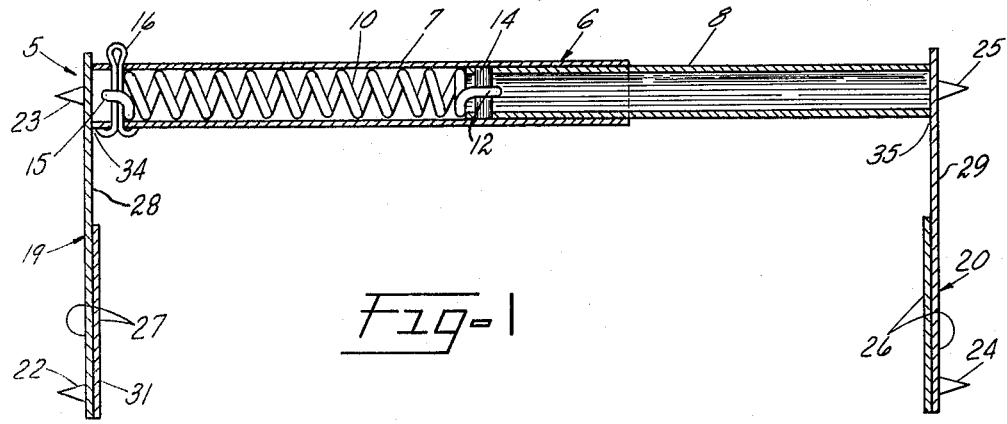
Fig-1
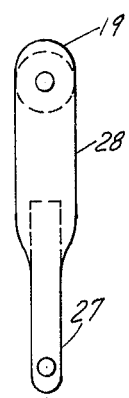
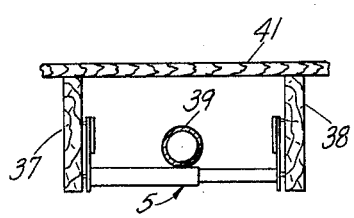
Fig-3
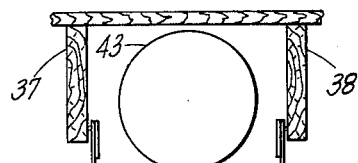
Fig-4
Fig-2
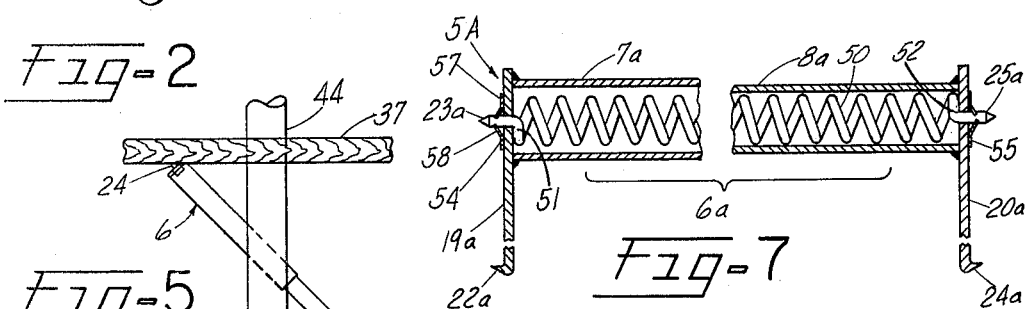
Fig-5  Fig-7
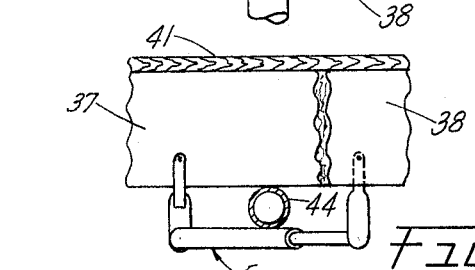
Fig-6
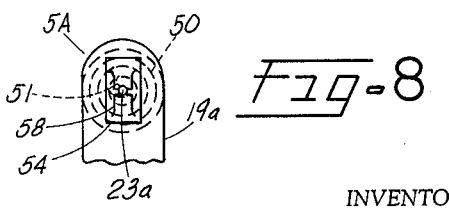
Fig-8
INVENTORS
WALTER C. HURD
LOUIS J. FETZER
BY
ATTORNEY United States Patent Office 3,245,677
Patented Apr. 12, 1966

3,245,677
PIPE SUPPORTING TOOL
Walter C. Hurd, 160 Lakeview Lane, South Russell, Ohio, and Louis J. Fetzer, 7774 Country Lane, Bainbridge, Ohio
Filed July 15, 1963, Ser. No. 294,996
7 Claims. (Cl. 269—254)

This invention relates to a tool for temporarily suspending a pipe or other elongate article in a position which may, for example, approximate a permanent position thereafter, such as between floor joists or other overhead structure, while the operations necessary to attach the pipe in its permanent position are performed.

In the plumbing and the heating and ventilation trades, it is frequently necessary or expedient for a man working alone, to install lengthy horizontal portions of a pipe or duct system. He generally experiences difficulty in supporting the pipe or duct as a whole while effecting the initial attachment thereof to a permanent support. Generally such initial attachment or other operation is performed near one end of the pipe. Those familiar with such work will appreciate the desirability of temporarily supporting the other end of the pipe while going forward with the work of including it into the intended pipe system. However, if the pipe installer has assistance, his helper may be freed for work other than that of helping him support and attach a pipe.

Hence, it is the primary object of this invention to provide a tool or device which may be instantly applied to wooden members, such as joists or beams or spaced structural members, providing opposed surfaces of hardness comparable to wood.

Another object is to provide a tool or device of the foregoing object which may be used to support the pipe or duct in transverse, including perpendicular, relation to the opposed members to which the tool is attached.

A further object is to provide the tool of the foregoing objects in a form that is instantly removable without interference with the permanently-mounted work piece which it previously supported.

Briefly speaking, the invention resides in a device or tool of generally U-shaped having a longitudinal expandable unit comprising a pair of elongate members in relatively movable, longitudinally overlapping, guide relationship, such as a pair of telescoping tubes; resilient means, such as a compression spring, connected to both members and acting on both to urge the unit to a desired expanded condition; a pair of arms, of which each is fixed to one of the members at opposite ends of the unit. In the normal use of the tool, both arms extend, cantilever fashion, in radial directions from the longitudinal axis of the unit and have pointed projections near their radially outer extremities tapering in a direction away from the other arm.

In the drawing with respect to which the invention is described:

FIG. 1 is a longitudinal elevation in section of a pipe-supporting device or tool constructed according to the invention;

FIG. 2 is an end view of the device shown in FIG. 1;

FIG. 3 illustrates the device of FIGS. 1 and 2 in place between a pair of floor joists with a pipe supported thereon;

FIG. 4 illustrates the device of the previous figures in a somewhat different position with a section of thin-walled duct supported thereon;

FIGS. 5 and 6 are plan and elevation views respectively, illustrating the use of the device when supporting a duct from floor joists in transverse relation to the duct;

FIG. 7 is a fragmentary, longitudinal shortened view in section of a modified pipe-supporting device; and FIG. 8 is a fragmentary end view of the device shown in FIG. 7.

Components of a tool 5 incorporating the invention, are most advantageously shown in cross section in FIG. 1. The tool 5, as shown, comprises a load-engageable longitudinally expandable unit, 6 having telescoping members or tubes 7 and 8 adapting the unit to receive a load, such as a pipe extending transversely thereover and resting thereon, when the tool is positioned for use. The tube 7, which has the larger diameter, houses a compression spring 10 and receives such portion of the tube 8 as may need to be accommodated therein in accordance with use or non-use of the tool. An eye portion 12 at one end of the spring 10 is secured to the tube 8 by a pin 14 extending through the eye portion. This pin is received in diametrically opposite holes adjacent the end of the tube 8 positioned inwardly of the tube 7. The eye portion 15 forming the other end of the spring 10 is anchored within and to the tube 7 by a cotter key 16.

The tool further comprises arms 19 and 20 which append from the unit 6 to give the tool 5 its U-shape. These arms 19, 20 are fixed as by welding to the tubes 7, 8 respectively. As shown, each arm extends at approximately right angles with the length or axis of the tube to which it is attached. As shown by the figures, the arms are of a length and spacing adapting the tool to receive a load, e.g., pipe or heating ducts therebetween and thus in combination with the top surface of the extensible unit 6, define a load-receiving region above the unit and between the arms which assures clearance for pipe with other structure disposed above the tool during use. As shown, each arm is provided with two sharply pointed projections, such as wedges or pins, extending and tapering therefrom in a direction away from the other arm. For example, the arm 19 has a pin or wedge 23 located approximately at the axis of the tube 7 and another pin or wedge 22 projecting from the arm near its radial extremity. The arm 20 has corresponding pins 24 and 25. Although the situations in which pins 23, 25 or pins 22, 24 will be selectively used to advantage are illustrated by FIGS. 3, 4, and 5, many other situations are possible. The pins or wedges 22, 23, 24 and 25 project as shown beyond adjacent respective arms 19, 20 and ends of the unit 6; this manner of construction is found also in the embodiment illustrated by FIG. 7 and described below.

The arms 19 and 20 each comprise a radially outer section (see section 27) which is narrower than a section (see sections 28 and 29) adjacent to the respective tube 7 or 8 to which it is fixed. In particular, the arm is narrow adjacent its outer pin 22 or 24 to enable use of the tool by attachment to joists which extend perpendicularly to the direction of the pipe to be supported. The narrowness of the arm adjacent its outermost pin enables the pin to project into, e.g., the wood joist. To stiffen the narrow outer section, each area may be provided with a reinforcing or strengthening member such as the plate 31.

The tool 5 may be otherwise reinforced, such as by gussets in corners between the arms 19, 20 and the tubes 7, 8 respectively. However, as lightness of the tool is desirable, reinforcement is maintained at a practical minimum.

FIG. 3 illustrates the use of the tool 5 between a pair of joists 37 and 38 to support a tube 39 such as water or electrical conduit underneath a floor 41. In the use illustrated, the arms 19 and 20 extend upwardly with respect to the tubes 7 and 8. However, the tool may be attached in a manner not shown to the joists with the arms 19 and 20 extending downwardly relative to the unit 6 when, e.g., it is desired to position the pipe closely to the floor 41. FIG. 4 illustrates the use of the tool 5 with a duct 43 of larger diameter, such as sheet metal heating and ventilating flues.

FIGS. 5 and 6 are plan and elevation views, respectively, illustrating the use of the tool 5 in supporting a duct 44 with its length in transverse relation to that of the joists 37 and 38. As shown, the unit 6 is aligned at approximately a 45° angle with the length of the joists. The points 22 and 24 penetrate the joists at nearly a 45° angle because of the narrowness of the outer sections 26, 27 of the arms. In order for the points or wedges 22 and 24 to penetrate the wood, each must have a length at least equal to, and preferably longer than, one half the width of the end portion of the associated arm. The tool is used most advantageously with the wider sections (e.g., section 28) of its arm disposed below the joists. The width of the duct in this mode of use will determine the angle at which the tool may be adjusted relative to the joists. With small tubes, the tool may be adjusted more nearly perpendicular to the joists.

A further embodiment of the invention is illustrated in in FIGS. 7 and 8 wherein the numerals of parts having a counterpart in the previously-described embodiment of FIGS. 1 and 2 are obtained by adding the letter "A" or "a." Shown in FIGS. 7 and 8 is a tool 5A comprising a unit 6a having telescoping tubes 7a and 8a which enclose a spring 50. This spring occupies the full length of the spring chamber enclosed by the unit 6a and the portions of the arms 19a and 20a which cover, and are welded or otherwise secured to, the ends of the tubes 7a and 8a, respectively.

In this latter embodiment, the spring 50 is preferably formed with end portions which provide sections 51, 52 which seat against the surface portions of the arms 19a, 20a facing internally of the tubes. The spring terminates in generally coaxially-extending tips 23a and 25a which protrude through complementary apertures in the arms 19a and 20a, centered along the axis of the unit 6a. The end portions of the springs are secured to each arm by an apertured fastener (see fasteners 54 and 55) of a well-known design which comprises a pair of flexible tabs 57 and 58 which press against the spring tip 23a, 25a extending therethrough. The fastener in either case is adjusted lengthwise of the spring tip to obtain tight seating of the fastener and the adjacent spring section 51, 52 at opposite sides of the arm 19a, 20a disposed therebetween.

As shown, the other points by which the device 5A may be anchored to building structure or the like, are wedges 22a and 24a which are formed by terminal portions of the arms 19a and 20a bent over in an outward endwise direction of the device about 90 degrees with lengthwise direction of the arms.

The construction of the second described tool 5A affords rotation of the arms 19a and the tube 7a fixed thereto relative to the spring 50 and also relative to the other arm 20a and the tube 8a joined therewith. During use, the expansive thrust of the spring 50 will cause the tool 5A to effect, under some circumstances, some self-adjustment regarding the relative angular relationship of the arms 19a and 20a about their common axis. This adjustment is not in the least objectionable and under some conditions, desired.

The present invention provides a convenient labor saving, inexpensive device for use by those engaged in duct system assembly work in the construction of buildings. The device is useful also for attaching, e.g., a cord by which a load may be supported at different levels. It may be useful in a variety of situations, such as a support for coat hangers, other tools, et cetera. While the device has been described essentially as a tool for establishing temporary duct support, its use as a support, temporarily or during periods of substantial duration or permanence, is largely a matter of intention.

What is claimed is:

1. A tool for supporting pipe or other articles adapted to be positioned between two spaced opposing surfaces provided by a material having a hardness in the order of that of wood comprising:
   (a) A longitudinally expandable load-engageable unit having a pair of elongate members connected in longitudinally overlapping, relatively movable, guide relationship;
   (b) resilient means connected to both members and reacting therewith to urge the unit to a longitudinally extended condition; and
   (c) a pair of arms, one fixed to each member at opposite ends of the unit and extending radially outwardly in cantilever relation with its respective member and the longitudinal axis of the unit, each arm having pointed means adjacent its radially outer extremity and tapering in a direction away from the other arm, each of said pointed means projecting in its respective direction beyond its respective adjacent arm and end of said unit;
   (d) said arms, being of a length, and the arms and said unit defining a load-receiving region above the unit and between the arms to provide clearance for a load between the unit and other structure in overhead relation with the tool during use.

2. A tool for supporting pipe or other articles adapted to be positioned between two spaced opposing surfaces provided by a material having a hardness in the order of that of wood comprising;
   (a) a pair of tubes, one being longitudinally movable within the other along a common longitudinal axis to provide a telescoping tubular load-engageable unit;
   (b) resilient means enclosed by the unit, connected to both tubes, and reacting therewith to urge the unit to a longitudinally extended condition;
   (c) a pair of arms, one fixed to each tube at opposite ends of the unit and extending therefrom in cantilever relation with its respective tube; and
   (d) wedges fixed on the arms adjacent the ends thereof remote from, and to the sides of the arms facing away from, the tubular unit to taper outwardly from said arm, each of said wedges projecting in its respective direction beyond its respective adjacent arm and end of said unit;
   (e) said arms being of a length, and the arms and said unit defining a load-receiving region above the unit and between the arms to provide clearance for a load between the unit and other structure in overhead relation with the tool during use.

3. The tool of claim 2 wherein: the wedge adjacent the end of each arm has a length at least equal to one-half the width of the end portion of said arm.

4. The tool of claim 2 comprising: a wedge fixed to each arm adjacent said longitudinal axis and projecting and tapering in a direction substantially parallel to that of said other wedge of said arm.

5. The tool of claim 2 wherein: said resilient means is a coil spring extending from one of said tubes into the other; each end portion of the spring being secured to the tube in which it is disposed to render each tube resiliently rotatable relative to the other.

6. The tool of claim 2 wherein: said arms are flat in planes perpendicular to said axis; and said arms terminate in bent-over tab positions forming said wedges.

7. The tool of claim 2 wherein: said arms have small apertures along said axis;

said resilient means is a coil spring comprising a coil section at each end of the spring seating against the inner side of the adjacent arm, and the spring terminates at each end in an axially extending tip protruding through and beyond each of said apertures; and said tool comprises fastening means gripping said spring tips and seating on the outer sides of the arms.

References Cited by the Examiner

UNITED STATES PATENTS

| | | | |
|---|---|---|---|
| 698,223 | 4/1902 | Prideaux | 211—123 |
| 1,425,247 | 8/1922 | Galbreath | 211—105.6 |
| 2,809,002 | 10/1957 | Rudolph | 248—205 |
| 2,917,263 | 12/1959 | Appleton et al. | 248—216 |

WILLIAM W. DYER, JR., *Primary Examiner.*

ROBERT C. RIORDON, *Examiner.*

W. D. BRAY, *Assistant Examiner.*